(12) United States Patent
Nakashima et al.

(10) Patent No.: US 11,801,751 B2
(45) Date of Patent: Oct. 31, 2023

(54) IMAGE DISPLAY APPARATUS, NON-TRANSITORY COMPUTER READABLE MEDIUM, AND IMAGE DISPLAY METHOD

(71) Applicant: TOYOTA JIDOSHA KABUSHIKI KAISHA, Toyota (JP)

(72) Inventors: Toyokazu Nakashima, Nagoya (JP); Shunsuke Sagara, Nisshin (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 17/537,065

(22) Filed: Nov. 29, 2021

(65) Prior Publication Data

US 2022/0169118 A1 Jun. 2, 2022

(30) Foreign Application Priority Data

Nov. 30, 2020 (JP) .................................. 2020-199182

(51) Int. Cl.
*B60K 35/00* (2006.01)
*G07F 17/24* (2006.01)

(52) U.S. Cl.
CPC ............ *B60K 35/00* (2013.01); *G07F 17/246* (2013.01); *B60K 2370/1529* (2019.05); *B60K 2370/1868* (2019.05); *B60K 2370/52* (2019.05)

(58) Field of Classification Search
CPC ............ B60K 35/00; B60K 2370/1529; B60K 2370/52; B60K 2370/1868; G07F 17/246
See application file for complete search history.

(56) References Cited

U.S. PATENT DOCUMENTS

| | | | |
|---|---|---|---|
| 11,308,805 B2* | 4/2022 | Kim | G08G 1/143 |
| 2005/0057374 A1 | 3/2005 | Tanaka et al. | |
| 2009/0167564 A1* | 7/2009 | Long-Tai | B62D 15/0285 340/932.2 |
| 2010/0283634 A1* | 11/2010 | Krautter | B62D 15/0275 340/932.2 |
| 2014/0176348 A1 | 6/2014 | Acker, Jr. et al. | |
| 2015/0154669 A1* | 6/2015 | Wu | G06Q 30/0284 705/13 |
| 2015/0294431 A1* | 10/2015 | Fiorucci | G07B 15/02 705/13 |
| 2015/0369613 A1 | 12/2015 | Stadler | |
| 2017/0154530 A1 | 6/2017 | Irion et al. | |
| 2017/0234694 A1* | 8/2017 | Flores | G08G 1/096827 701/428 |
| 2017/0355307 A1* | 12/2017 | Ha | G08G 1/143 |
| 2018/0130351 A1* | 5/2018 | Ha | G06Q 10/02 |
| 2019/0385449 A1* | 12/2019 | Pateropoulos | G08G 1/052 |

(Continued)

FOREIGN PATENT DOCUMENTS

| | | |
|---|---|---|
| CN | 108016435 A | 5/2018 |
| JP | 2004-069549 A | 3/2004 |

(Continued)

*Primary Examiner* — Chico A Foxx
(74) *Attorney, Agent, or Firm* — Oliff PLC

(57) ABSTRACT

An image display apparatus includes a controller, a sensor, and a display. The controller is configured to acquire sensor information from the sensor, recognize surrounding real space from the sensor information, extract an available parking spot in the real space, and project a virtual image indicating the parking spot onto the real space using the display.

17 Claims, 5 Drawing Sheets

(56) References Cited

U.S. PATENT DOCUMENTS

2021/0372805 A1* 12/2021 Fujimori .......... G08G 1/096827
2022/0292969 A1*  9/2022 Chen .................... B62D 15/027

FOREIGN PATENT DOCUMENTS

| JP | 2005-75013 A | 3/2005 |
| JP | 2016-118851 A | 6/2016 |
| JP | 2020-135103 A | 8/2020 |

* cited by examiner

FIG. 3

| PARKING SPOT ID | LOCATION | PARKING FEE | IN USE? |
|---|---|---|---|
| P01 | L01 | 500 YEN PER HOUR | No |
| P02 | L02 | 400 YEN PER HOUR | No |
| P03 | L03 | 700 YEN PER HOUR | Yes |
| ⋮ | ⋮ | ⋮ | ⋮ |

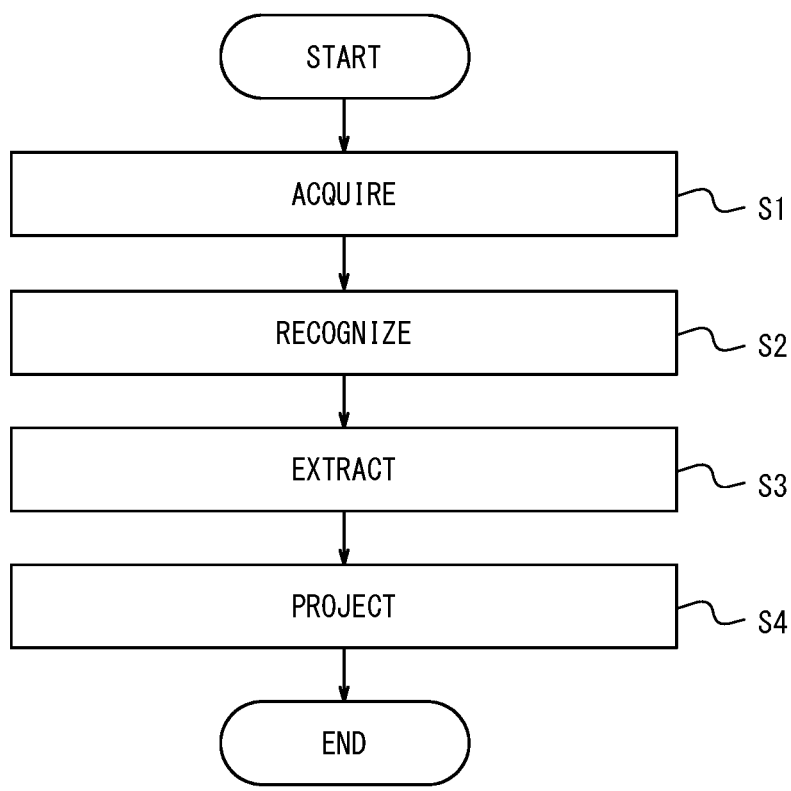

IMAGE DISPLAY APPARATUS, NON-TRANSITORY COMPUTER READABLE MEDIUM, AND IMAGE DISPLAY METHOD

CROSS-REFERENCE TO RELATED APPLICATION

This application claims priority to Japanese Patent Application No. 2020-199182, filed on Nov. 30, 2020, the entire contents of which are incorporated herein by reference.

TECHNICAL FIELD

The present disclosure relates to an image display apparatus, a program, and an image display method.

BACKGROUND

In the case of displaying on a map parking lots in the vicinity of the current location of a vehicle, technology for determining the background color or text color of parking lot icons from one of white, green, and orange according to the usage status or charge of each of the parking lots is known (e.g., Patent Literature (PTL) 1).

CITATION LIST

Patent Literature

PTL 1: JP 2004-69549 A

SUMMARY

In the technology described above, the locations of the parking lots are displayed, but positions where the vehicle is able to park are not displayed.

It would be helpful to provide an image display apparatus, a program, and an image display method that enable a driver to visually recognize a position where a vehicle is able to park.

An image display apparatus according to an embodiment of the present disclosure includes:
  a controller;
  a sensor; and
  a display,
  wherein
  the controller is configured to:
  acquire sensor information from the sensor,
  recognize surrounding real space from the sensor information,
  extract an available parking spot in the real space, and
  project a virtual image indicating the parking spot onto the real space using the display.

A program according to an embodiment of the present disclosure is configured to cause a computer, as an image display apparatus including a sensor and a display, to execute operations, the operations including:
  acquiring sensor information from the sensor;
  recognizing surrounding real space from the sensor information;
  extracting an available parking spot in the real space; and
  projecting a virtual image indicating the parking spot onto the real space using the display.

An image display method according to an embodiment of the present disclosure is performed by an image display apparatus including a controller, a sensor, and a display, the image display method including:
  acquiring sensor information from the sensor;
  recognizing surrounding real space from the sensor information;
  extracting an available parking spot in the real space; and
  projecting a virtual image indicating the parking spot onto the real space using the display.

According to an image display apparatus, a program, and an image display method according to an embodiment of the present disclosure, a driver can visually recognize a position where a vehicle is able to park.

BRIEF DESCRIPTION OF THE DRAWINGS

In the accompanying drawings:

FIG. 3 is a diagram illustrating a data structure of a parking spot database (DB);

FIG. 5 is a flowchart illustrating operations of the image display apparatus.

DETAILED DESCRIPTION

Figure 1:
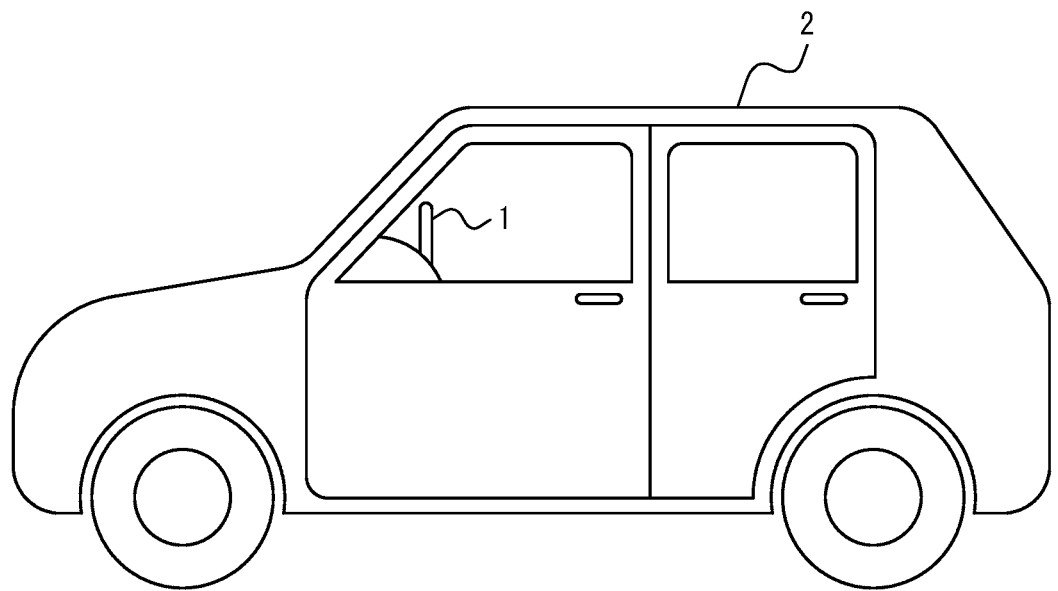
FIG. 1 is a schematic diagram of an image display apparatus and a vehicle according to an embodiment.

FIG. 1 is a schematic diagram of an image display apparatus 1 and a vehicle 2 according to an embodiment. The image display apparatus 1 according to the present embodiment is a HUD (Head-Up Display) mounted on the vehicle 2. As an alternative example, the image display apparatus 1 may be Augmented Reality (AR) glasses that are worn and operated by a driver of the vehicle 2. The image display apparatus 1 may be any portable terminal onto which an image can be projected.

Only the single image display apparatus 1 is illustrated in FIG. 1. As an alternative example, functional parts, which are described below, of the image display apparatus 1 may be distributed. For example, a controller 11 that is configured to control the image display apparatus 1 may be provided outside the image display apparatus 1.

Figure 2:
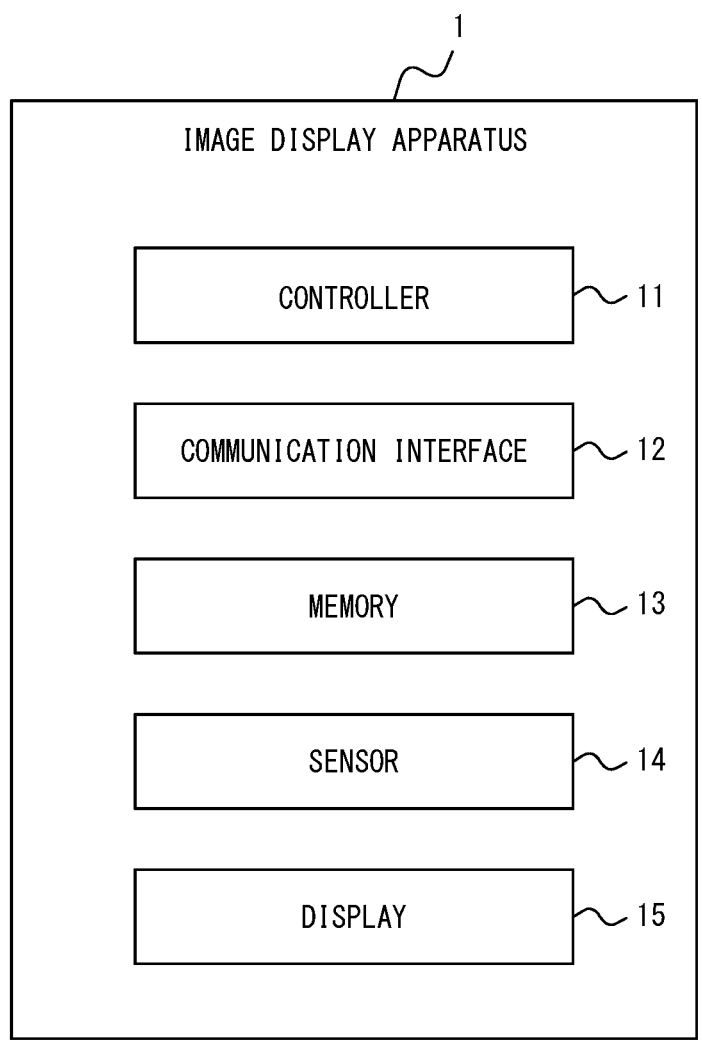
FIG. 2 is a block diagram illustrating a configuration of the image display apparatus.

An outline of processing to be executed by the image display apparatus 1 according to the present embodiment will be described. The image display apparatus 1 acquires sensor information from a sensor 14, recognizes surrounding real space from the sensor information, extracts an available parking spot in the real space, and projects a virtual image indicating the parking spot onto the real space using a display 15. With this configuration, the image display apparatus 1 projects the available parking spot onto the real space, thus enabling the driver to visually recognize a position where an individual vehicle is able to park. Furthermore, the image display apparatus 1 eliminates time and effort required of a provider of the parking spot to draw white lines and to install a signboard for the parking spot, thus reducing an initial capital investment burden on the provider. The image display apparatus 1 can thus assist the general public to easily start a parking business. With reference to FIG. 2, an internal configuration of the image display apparatus 1 will be described in detail.

The image display apparatus 1 includes the controller 11, a communication interface 12, a memory 13, the sensor 14, and the display 15. The components of the image display apparatus 1 are communicably connected to one another via a dedicated line, for example.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of the dedicated circuits may include a Field-Programmable Gate Array (FPGA) and an Application Specific Integrated Circuit (ASIC). The controller 11 may include an Electronic Control Unit (ECU).

The communication interface 12 includes, for connecting to a network, one or more communication modules that conform to wired or wireless LAN (Local Area Network) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 is configured to transmit and receive any information via the network.

The memory 13 includes, for example, a semiconductor memory, a magnetic memory, an optical memory, or a combination of at least two of these, but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The memory 13 may also store various types of information regarding operations or control of the image display apparatus 1. The memory 13 may store a system program, an application program, embedded software, or the like. The memory 13 includes a parking spot DB, which will be described below.

The sensor 14 may be at least one of an image sensor, an accelerometer, and/or a location sensor. The sensor 14 detects the position of the image display apparatus 1. The sensor 14 may further detect the posture, orientation, and the like of the image display apparatus 1. The sensor 4 transmits detected information to the controller 11 as sensor information.

The location sensor, as the sensor 14, includes at least one GNSS receiver. The term "GNSS" is an abbreviation of Global Navigation Satellite System. GNSS includes, for example, GPS, QZSS, BeiDou, GLONASS, and/or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The sensor 14 measures the position of the image display apparatus 1. A measurement result of the sensor 14 is acquired by the controller 11 as position information on the image display apparatus 1. "Position information" is information that can identify the position of the image display apparatus 1, and includes, for example, coordinates of the image display apparatus 1.

The display 15 includes at least one interface for output. In a case in which the image display apparatus 1 is a HUD, the interface for output is, for example, a combiner. In a case in which the image display apparatus 1 is AR glasses, the interface for output is, for example, an LCD or organic EL display. The term "LCD" is an abbreviation of liquid crystal display. The term "EL" is an abbreviation of electro luminescence. The display 15 outputs information resulting from operations of the image display apparatus 1. The display 15 may be connected to the image display apparatus 1 as an external output device, instead of being included in the image display apparatus 1. As a connection method, any technology such as USB, HDMI® (HDMI is a registered trademark in Japan, other countries, or both), or Bluetooth® can be used.

The vehicle 2 includes any type of vehicle, such as, for example, a micromobility device, a gasoline vehicle, a diesel vehicle, an HEV, a PHEV, a BEV, or an FCEV. The components of the vehicle 2 are communicably connected to one another via an on-board network such as a Controller Area Network (CAN), or a dedicated line, for example. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 2 is driven by a user. As an alternative example, driving of the vehicle 2 may be automated at any level. The automation level is, for example, any one of Level 1 to Level 5 according to the level classification defined by SAE. The name "SAE" is an abbreviation of Society of Automotive Engineers. The vehicle 2 may be a MaaS-dedicated vehicle. The term "MaaS" is an abbreviation of Mobility as a Service.

Hereinafter, processing executed in the image display apparatus 1 according to the present embodiment will be described in detail. As an example, a scene will be described in which a user who is driving the vehicle 2 mounted with the image display apparatus 1 searches for a spot where the vehicle 2 is able to park.

The controller 11 of the image display apparatus 1 determines whether a projection start condition is satisfied. The projection start condition includes, for example, at least one of the following:
 an arrival of the vehicle 2 at a destination,
 an instruction of parking of the vehicle 2 (e.g., a press of a parking button), and/or
 an activation (e.g. turn-on) of a direction indicator (e.g. a winker or hazard lights) of the vehicle 2 at a place other than an intersection.

In a case in which the projection start condition is determined to be satisfied, the controller 11 acquires sensor information from the sensor 14.

The controller 11 recognizes surrounding real space from the acquired sensor information. For example, the controller 11 recognizes the position where the image display apparatus 1 is present. Further, the controller 11 can recognize the posture, orientation, and the like of the image display apparatus 1.

The controller 11 searches for an available parking spot present in the vicinity (e.g., within a predetermined distance) of the image display apparatus 1 with reference to the parking spot DB in the memory 13.

As illustrated in FIG. 3, the parking spot DB stores, in association with a parking spot ID, a location of a parking spot, a parking fee, and information indicating whether the parking spot is being used by another vehicle (corresponding to "in use?" in FIG. 3).

The parking fee can be set freely by a provider of the parking spot. For example, the parking fee may be set as follows:
- a rate per unit of time (e.g., minute, hour, day, month, or year), and/or
- a maximum charge.

In the example of FIG. 3, a parking spot P01 and a parking spot P02 are not used by other vehicles. The controller 11 extracts the parking spots P01 and P02 as available parking spots.

Figure 4:
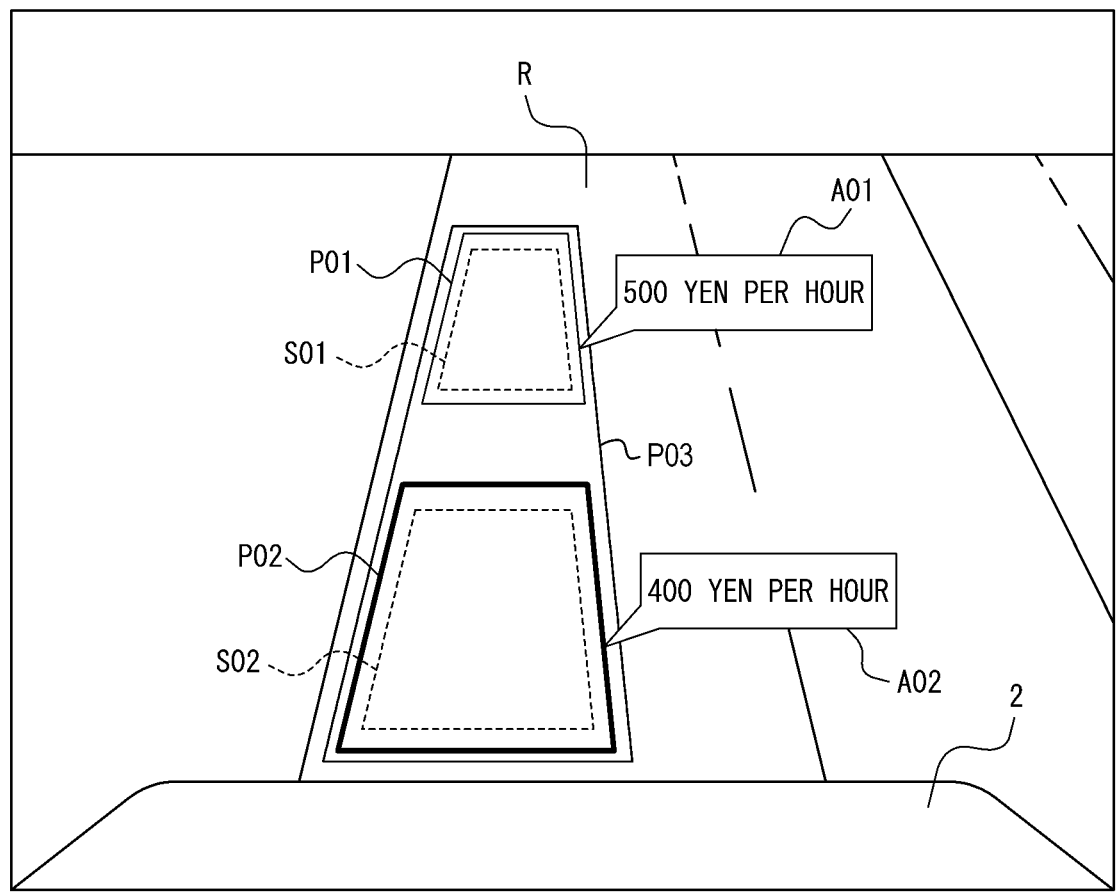
FIG. 4 is a diagram illustrating projected available parking spots.

The controller 11 projects, using the display 15, virtual images indicating the parking spots P01 and P02 onto the real space. Each spot may be the size of a single vehicle. As illustrated in FIG. 4, the parking spots P01 and P02 are projected onto a road R. As an alternative example, the parking spots P01 and P02 may be projected in the air. The parking spots P01 and P02 are each indicated by a frame. The shape of the frame can be set arbitrarily by the provider of the parking spot (e.g., an owner of the parking spot). The frame may be indicated by a solid line or another type of line, such as a dashed or dotted line.

The controller 11 can further project, using the display 15, a virtual image indicating an annotation associated with each of the parking spots P01 and P02. For example, the controller 11 identifies, as the annotation, the parking fee ("500 yen per hour") associated with the parking spot P01 in the parking spot DB. As illustrated in FIG. 4, the controller 11 projects an annotation A01. The controller 11 projects an annotation A02 in the same way as the annotation A01.

In a case in which the controller 11 has extracted a plurality of available parking spots, the controller 11 may project the plurality of available parking spots distinguishably from each other by at least one of a shape, a pattern, and/or a color. For example, the controller 11 may vary the shapes of frames of the parking spots according to the parking fee. As illustrated in FIG. 4, the controller 11 projects the frame of the parking spot P01, whose parking fee is 500 yen per hour, with a normal thickness. On the other hand, the controller 11 projects the frame of the parking spot P02, whose parking fee is 400 yen per hour, thicker than the frame of the parking spot P01.

As an alternative example, the controller 11 may vary the patterns or colors of the parking spots according to the parking fee using a heat map. For example, the controller 11 may project a parking spot whose hourly rate is between 500 yen and 1,000 yen and a parking spot whose hourly rate exceeds 1,000 yen in different patterns or colors.

In addition or in general, the provider of the parking spot may set the parking fee lower, on the condition that the user does shopping or another activity at a nearby store. In this case, the controller 11 may include at least one of the following information in the annotation:
- a list of stores at which the user should do shopping or the activity to receive a discount on the parking fee, and/or
- a discount rate, if any, or the amount of the parking fee after the discount.

As an alternative or additional example, the controller 11 may determine, with reference to the memory 13, whether the destination of the driver of the vehicle 2 is a store. Upon detecting that the destination is a store, the controller 11 extracts, from the parking spot DB, a parking spot that offers a discount by shopping at the store. The controller 11 may project the extracted parking spot distinguishably from other parking spots by at least one of a shape, a pattern, and/or a color. As an alternative example, the controller 11 may project the extracted parking spot preferentially over other parking spots.

As illustrated in FIG. 4, the parking spots P01 and P02 are projected individually as separate spots. As an alternative example, the controller 11 may project the two spots together into one relatively large spot P03 onto the real space, in a case in which the distance between the image display apparatus 1 and the parking spots P01 and P02 exceeds a reference value. The controller 11 may project the two spots P01 and P02 individually, in a case in which the controller 11 determines that the distance between the image display apparatus 1 and the two spots P01 and P02 does not exceed the reference value due to the vehicle 2 approaching the two spots P01 and P02.

As illustrated in FIG. 4, the controller 11 projects, using the display 15, an occupied area S01 and an occupied area S02 in the case of completing parking of the vehicle 2 in the parking spot P01 and the parking spot P02, respectively. The occupied areas S01 and S02 are projected in two dimensions. As an alternative example, the occupied areas S01 and S02 may be projected in three dimensions.

The controller 11 may vary the parking fee for the parking spots P01 and P02 according to the sizes of the occupied areas S01 and S02.

As an alternative example, the controller 11 may project only a parking spot associated with the parking fee that satisfies a predetermined condition. For example, the controller 11 may project only a parking spot whose hourly rate does not exceed 450 yen. In the example of FIG. 3, the controller 11 may project only the parking spot P02 whose hourly rate is 400 yen. As an alternative example, the predetermined condition may be an average, minimum, or maximum rate of the parking fee for nearby parking spots. The predetermined condition may be an average rate of the parking fee for parking spots where the driver has parked in the past. The predetermined condition can be set arbitrarily by the driver.

With reference to FIG. 5, an image display method executed by the image display apparatus 1 according to the present embodiment will be described.

In step S1, the image display apparatus 1 acquires sensor information from the sensor 14.

In step S2, the image display apparatus 1 recognizes surrounding real space from the sensor information.

In step S3, the image display apparatus 1 extracts an available parking spot in the real space.

In step S4, the image display apparatus 1 projects a virtual image indicating the extracted parking spot onto the real space.

As described above, according to the present embodiment, the image display apparatus 1 acquires sensor information from the sensor 14, recognizes surrounding real space from the sensor information, extracts an available parking spot in the real space, and projects a virtual image indicating the parking spot onto the real space using the display 15. With this configuration, the image display apparatus 1 projects the available parking spot onto the real space, thus enabling the driver to visually recognize a position where an individual vehicle is able to park.

According to the present embodiment, controller 11 determines whether the projection start condition is satisfied, and, in a case in which the project start condition is determined to be satisfied, projects the available parking spot onto the real space. The projection start condition includes at least one of an arrival of the vehicle 2 at the set destination, an instruction of parking of the vehicle 2, and/or an activation of the direction indicator of the vehicle 2 at a place other than an intersection. With this configuration, the controller 11 performs projection only when needed, thus reducing interference with the driver's operation by unnecessary projection.

According to the present embodiment, upon extracting a plurality of available parking spots in the real space, the controller 11 projects the plurality of available parking spots together into one spot onto the real space, in a case in which the distance between the image display apparatus 1 and the plurality of available parking spots exceeds a reference value. In a case in which the distance does not exceed the reference value, the controller 11 projects the plurality of available parking spots individually onto the real space. With this configuration, the controller 11 projects the plurality of parking spots individually, only in a case in which the image display apparatus 1 is close to the plurality of parking spots, i.e. it is necessary to select which spot to park in. The controller 11 projects the plurality of parking spots together into one spot in a case in which the image display apparatus 1 is relatively distant from the plurality of parking spots, thereby reducing a processing load and complicated display.

According to the present embodiment, the controller 11 projects, onto the real space, only a parking spot associated with the parking fee that satisfies the predetermined condition, of the extracted available parking spot. According to the present embodiment, upon extracting a plurality of available parking spots in the real space, the controller 11 projects the plurality of parking spots distinguishably from each other by at least one of a shape, a pattern, and/or a color according to the parking fee. With this configuration, the controller 11 performs projection in accordance with the needs of the driver, thereby improving convenience and satisfaction.

According to the present embodiment, the controller 11 projects, together with the available parking spot, the occupied area in the case of completing parking of the vehicle 2 in the available parking spot. With this configuration, the controller 11 can provide the driver, prior to parking, with an image of completion of the parking, thus assisting the driver in selecting which spot to park in.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each means or each step can be rearranged without logical inconsistency, and a plurality of means or steps can be combined into one or divided.

For example, in the above embodiment, a program that executes all or some of the functions or processing of the image display apparatus 1 may be recorded on a computer readable recording medium. The computer readable recording medium includes a non-transitory computer readable medium and may be a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may be provided as a program product. The present disclosure can also be implemented as a program executable by a processor.

The computer temporarily stores in a main memory, for example, a program recorded on a portable recording medium, or a program transferred from the server. Then, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

The invention claimed is:

1. An image display apparatus comprising:
a controller;
a sensor; and
a display,
wherein
the controller is configured to:
acquire sensor information from the sensor,
recognize surrounding real space from the sensor information,
extract an available parking spot in the real space,
project a virtual image indicating the parking spot onto the real space using the display, and
upon extracting a plurality of available parking spots in the real space,
project the plurality of available parking spots together into one spot onto the real space in a case in which a distance between the image display apparatus and the plurality of available parking spots exceeds a reference value, and
project the plurality of available parking spots individually onto the real space in a case in which the distance does not exceed the reference value.

2. The image display apparatus according to claim 1, wherein the controller is configured to determine whether a projection start condition is satisfied, and in a case of determining that the projection start condition is satisfied, project the available parking spot onto the real space.

3. The image display apparatus according to claim 2, mounted on a vehicle or operated by a driver of the vehicle, wherein the projection start condition includes at least one of an arrival of the vehicle at a set destination, an instruction of parking of the vehicle, and/or an activation of the vehicle's direction indicator at a place other than an intersection.

4. The image display apparatus according to claim 1, wherein the controller is configured to project, onto the real space, only a parking spot associated with a parking fee satisfying a predetermined condition, of the extracted available parking spot.

5. The image display apparatus according to claim 1, wherein the controller is configured to, upon extracting a plurality of available parking spots in the real space, project the plurality of parking spots distinguishably from each other by at least one of a shape, a pattern, and/or a color according to a parking fee.

6. The image display apparatus according to claim 1, mounted on a vehicle or operated by a driver of the vehicle, wherein the controller is configured to project, along with the available parking spot, an occupied area in a case of completing parking of the vehicle in the available parking spot.

7. A non-transitory computer readable medium storing a program configured to cause a computer, as an image display apparatus including a sensor and a display, to execute operations, the operations comprising:
 acquiring sensor information from the sensor;
 recognizing surrounding real space from the sensor information;
 extracting an available parking spot in the real space;
 projecting a virtual image indicating the parking spot onto the real space using the display, and
 upon extracting a plurality of available parking spots in the real space,
  projecting the plurality of available parking spots together into one spot onto the real space in a case in which a distance between the image display apparatus and the plurality of available parking spots exceeds a reference value; and
  projecting the plurality of available parking spots individually onto the real space in a case in which the distance does not exceed the reference value.

8. The non-transitory computer readable medium according to claim 7, wherein the operations further comprise:
 determining whether a projection start condition is satisfied; and
 in a case of determining that the projection start condition is satisfied, projecting the available parking spot onto the real space.

9. The non-transitory computer readable medium according to claim 8, wherein
 the image display apparatus is mounted on a vehicle or operated by a driver of the vehicle, and
 the projection start condition includes at least one of an arrival of the vehicle at a set destination, an instruction of parking of the vehicle, and/or an activation of the vehicle's direction indicator at a place other than an intersection.

10. The non-transitory computer readable medium according to claim 7, wherein the operations further comprise projecting, onto the real space, only a parking spot associated with a parking fee satisfying a predetermined condition, of the extracted available parking spot.

11. The non-transitory computer readable medium according to claim 7, wherein the operations further comprise, upon extracting a plurality of available parking spots in the real space, projecting the plurality of parking spots distinguishably from each other by at least one of a shape, a pattern, and/or a color according to a parking fee.

12. The non-transitory computer readable medium according to claim 7, wherein
 the image display apparatus is mounted on a vehicle or operated by a driver of the vehicle, and
 the operations further comprise projecting, along with the available parking spot, an occupied area in a case of completing parking of the vehicle in the available parking spot.

13. An image display method performed by an image display apparatus including a controller, a sensor, and a display, the image display method comprising:
 acquiring sensor information from the sensor;
 recognizing surrounding real space from the sensor information;
 extracting an available parking spot in the real space;
 projecting a virtual image indicating the parking spot onto the real space using the display, and
 upon extracting a plurality of available parking spots in the real space,
  projecting the plurality of available parking spots together into one spot onto the real space in a case in which a distance between the image display apparatus and the plurality of available parking spots exceeds a reference value; and
  projecting the plurality of available parking spots individually onto the real space in a case in which the distance does not exceed the reference value.

14. The image display method according to claim 13, further comprising:
 determining whether a projection start condition is satisfied; and
 in a case of determining that the projection start condition is satisfied, projecting the available parking spot onto the real space.

15. The image display method according to claim 14, wherein
 the image display apparatus is mounted on a vehicle or operated by a driver of the vehicle, and
 the projection start condition includes at least one of an arrival of the vehicle at a set destination, an instruction of parking of the vehicle, and/or an activation of the vehicle's direction indicator at a place other than an intersection.

16. The image display method according to claim 13, further comprising projecting, onto the real space, only a parking spot associated with a parking fee satisfying a predetermined condition, of the extracted available parking spot.

17. The image display method according to claim 13, further comprising, upon extracting a plurality of available parking spots in the real space, projecting the plurality of parking spots distinguishably from each other by at least one of a shape, a pattern, and/or a color according to a parking fee.

* * * * *